United States Patent [19]

White et al.

[11] Patent Number: 5,538,282
[45] Date of Patent: Jul. 23, 1996

[54] STEERING COLUMN ASSEMBLY

[75] Inventors: David A. White, Goodrich; Rodney L. Eaton, Clarkston, both of Mich.

[73] Assignee: Chrysler Corporation, Auburn Hills, Mich.

[21] Appl. No.: 317,065

[22] Filed: Oct. 3, 1994

[51] Int. Cl.⁶ ........................... B62D 1/16
[52] U.S. Cl. ................... 280/779; 74/493; 280/775; 384/517; 384/536
[58] Field of Search ............... 280/775, 777, 280/779; 74/492, 493; 384/517, 518, 535, 536; 267/141.3, 141.7, 150

[56] References Cited

U.S. PATENT DOCUMENTS

| | | | |
|---|---|---|---|
| 2,509,587 | 5/1950 | Creson | 384/518 |
| 4,606,658 | 8/1986 | Hofmann et al. | 384/517 |
| 5,178,411 | 1/1993 | Fevre et al. | 280/775 |
| 5,193,917 | 3/1993 | Adler et al. | 384/517 |
| 5,234,100 | 8/1993 | Cook | 384/518 |

FOREIGN PATENT DOCUMENTS 572821 12/1993 European Pat. Off. ............ 74/493

*Primary Examiner*—Eric D. Culbreth
*Attorney, Agent, or Firm*—Edward A. Craig

[57] ABSTRACT

A steering column assembly for an automotive vehicle has a bearing which supports the steering shaft and a spring wedge unit for supporting the bearing. The spring wedge unit is in the form of an integral one-piece ring of flexible resilient material, preferably urethane, and encircles the shaft. The ring has an annular wedge and an integral annular spring flange. The wedge has a cylindrical radially inner surface in bearing contact with the shaft, and a conical radially outer surface providing a radially inner support for the bearing. The spring flange is tapered and abuts a tapered portion of the shaft under pressure which resiliently flexes the spring flange and resists axial movement of the ring to dampen vibration and suppress noise.

8 Claims, 2 Drawing Sheets

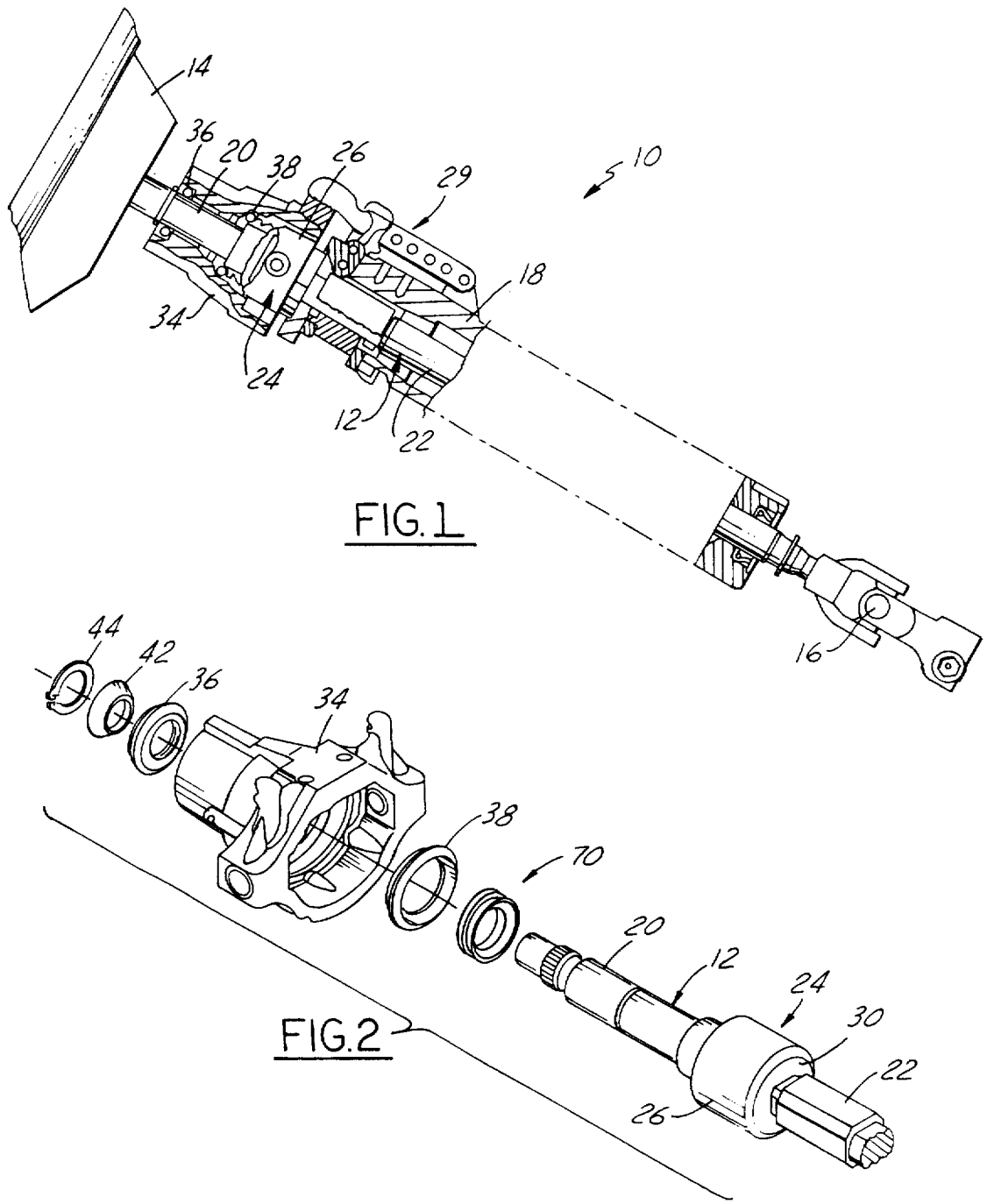

5,538,282

STEERING COLUMN ASSEMBLY

FIELD OF INVENTION

This invention relates generally to a steering column assembly of an automotive vehicle and more particularly to a spring wedge unit for a bearing in the steering column.

BACKGROUND AND SUMMARY OF THE INVENTION

The conventional bearing support system in a steering column of an automotive vehicle comprises a hardened steel wedge on the steering shaft for supporting the inner race of a bearing, and a separate steel wave spring to back up the wedge. One common complaint is that this type of bearing support vibrates and becomes noisy over rough roads, the noise being sometimes referred to as "bearing clack". The problem becomes worse as the wedge wears.

Based on laboratory testing, the natural frequency of the steering column is believed to lie close to that of the bearing support system. This is said to cause the system to relax, allowing the wedge to back out leaving a space between the shaft and the bearing. The resulting vibration and noise becomes objectionable and accordingly an improved bearing support system is needed.

In accordance with the present invention, a spring wedge unit is provided for the bearing comprising an integral one-piece ring of flexible resilient material, preferably urethane. One end portion of the ring is in the form of a wedge which has a cylindrical radially inner surface in bearing contact with the steering shaft, and a conical radially outer surface which provides a radially inner support for the bearing.

The spring wedge unit also has an annular spring flange extending from the large end of the wedge. The spring flange is frusto-conical and is adapted to bear against an annular portion of the steering shaft. The spring flange abuts the annular portion of the steering shaft under pressure and is resiliently flexed to resist axial movement of the ring and hold the wedge portion of the ring firmly against the inner race of the bearing. In one embodiment, the conical surface of the wedge extends at an angle of about 20° and the spring flange is angled at about 30°.

The ring also preferably includes an integral annular stop which projects radially outwardly from the large end of the wedge portion of the ring to provide an axial stop for the bearing.

It is a primary object of this invention to provide a steering column assembly having a spring wedge unit for the inner race of the bearing, which dampens vibration and suppresses noise and has the foregoing features.

Another object is to provide a steering column assembly in which the spring wedge unit of a one-piece, integral construction serving both as a wedge for the bearing and a spring back-up.

Another object is to provide a spring wedge unit for a steering column which is capable of being readily and inexpensively manufactured.

Other objects, features, and advantages of the invention will become more apparent as the following description proceeds, especially when considered with the accompanying drawings and claims.

BRIEF DESCRIPTION OF THE DRAWINGS

FIG. 1 is a side elevational view with parts broken away and in section showing a steering column assembly having a spring wedge unit of integral one-piece construction, all constructed in accordance with the invention.

FIG. 2 is an exploded view of various parts making up the steering column assembly, including the steering shaft, bearings, and the spring wedge unit for supporting one of the bearings.

DETAILED DESCRIPTION OF A PREFERRED EMBODIMENT

Figure 3:
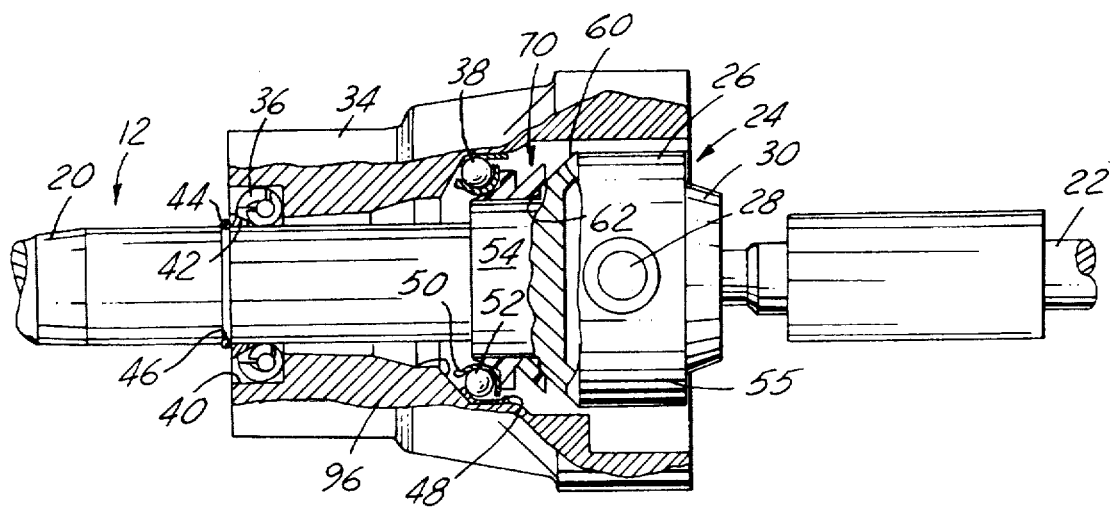
FIG. 3 is an enlarged fragmentary view, partly in section, showing the bearings which support the steering shaft within a housing, and the spring wedge unit for supporting one of the bearings.
Figure 4:
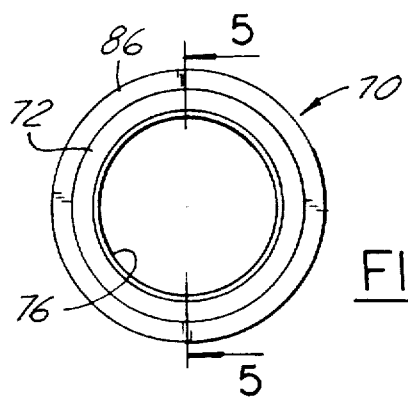
FIG. 4 is an end view of the spring wedge unit.
Figure 5:
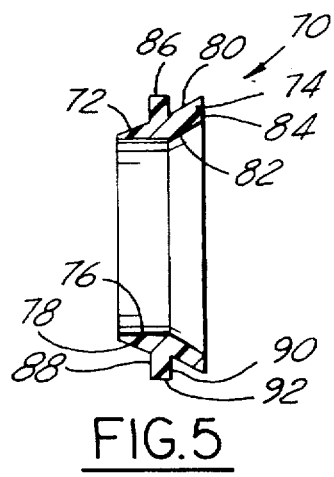
FIG. 5 sectional view taken on the line 5—5 in FIG. 4.

Referring now more particularly to the drawings, the steering column assembly 10 comprises an elongated steering shaft 12 which is inclined downwardly and forwardly and has a steering wheel 14 at the upper end. The lower end of the steering shaft is connected to the steering mechanism (not shown) and pivots about pivot 16. The steering shaft is supported for rotation in an elongated tubular housing 18.

The steering column in this instance is shown as being of the tilt type, although the invention is equally applicable to a non-tilting steering column. The steering shaft has an upper shaft portion 20 connected to a lower shaft portion 22 by a universal joint 24. The universal joint includes a hollow enlargement 26 on the lower end of the upper shaft portion providing an outer coupling. An inner coupling 30 within the hollow interior of the enlargement or outer coupling 26 is connected to the outer coupling by a pivot 28. The upper end of the lower shaft portion 22 has a pivot connection (not shown) to the inner coupling 30, which pivot connection is at right angles to the pivot 28. A latching device 29 is provided to lock the upper shaft portion 29 in the desired tilted position relative to the lower shaft portion 22.

The lower end of the upper steering shaft portion 20, including the universal joint 24, is mounted in a tubular casting or housing 34 which is rigidly mounted to suitable vehicle support structure. As best shown in FIG. 3, two annular bearings 36 and 38 are provided for the upper portion 20 of the steering shaft. Bearing 36 surrounds the upper shaft portion 20 and is disposed in a recess 40 in the housing 34, being held thereby by an annular wedge 42 on the shaft portion 20 backed up by a snap ring 44 in a shaft groove 46. Bearing 36 supports the shaft for rotation, and the bearing, wedge and snap ring prevent axial movement of the shaft relative to the bearing rightward in FIG. 3.

The bearing 38 comprises a circular outer race 48, a circular inner race 50 and a series of balls 52 confined between the races. Bearing 38 surrounds a reduced axial extension 54 of the enlargement 26. The main body portion 55 of the enlargement 26 has a frusto-conical portion 60 which tapers radially inwardly toward the axial extension. A circular, radially extending shoulder 62 is disposed between the inner end of the tapered portion 60 and the axial extension 54.

The inner race of the bearing 38 is supported by a spring wedge unit 70. The spring wedge unit 70 is in the form of a one-piece integral, flexible, resilient ring and is preferably formed of urethane, although other plastic materials may be substituted. The spring wedge unit 70 includes a wedge 72 and a spring flange 74. The wedge 72 is at one end of the ring and has a cylindrical, radially inner surface 76 of uniform circular cross-section which has substantially the same radius as that of the extension 54 of the enlargement 26 and is in full surface-to-surface bearing engagement with the extension so that the ring turns with the steering shaft when the shaft turns. The wedge 72 has a conical radially outer surface 78 which is concentric with the radially inner surface 76 and tapers towards and intersects the radially inner surface 76 at one end of the ring.

Inclining radially outwardly from the large end of the wedge 72 is the integral annular spring flange 74. The spring flange 74 is frusto-conical and has radially inner and outer surfaces 80 and 82 which are tapered with respect to the radially inner face 76 of the wedge at an angle preferably of 30°, terminating at the end of the flange in a radially extending surface 84 which is perpendicular to surface 76.

The spring wedge unit or ring 70 further comprises an integral annular stop 86 which is between the opposite ends of the ring and projects radially outwardly from the large end of the conical surface 78 of the wedge 72. The stop has circular, axially spaced surfaces 88 and 90 which extend radially outwardly and perpendicular to surface 76 and are connected at the outer edges by a cylindrical surface 92.

Figure 6:
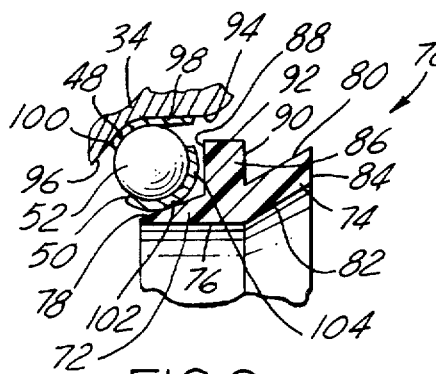
FIG. 6 is an enlargement of a portion of FIG. 3.
Figure 7:
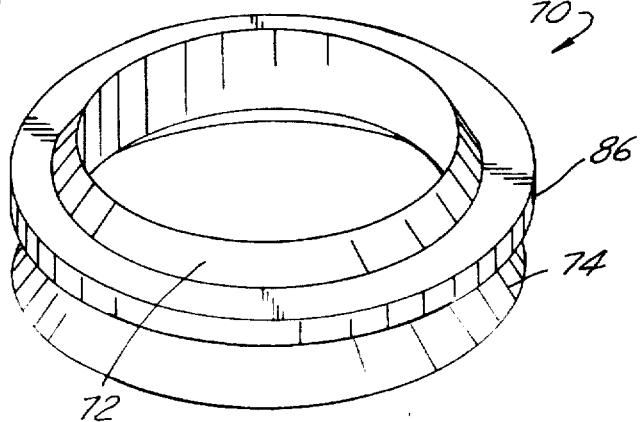
FIG. 7 is a perspective view of the spring wedge unit.

Referring to FIG. 6, the tubular housing 34 has a cylindrical radially inner wall 94 which connects into a radially inwardly tapering frusto-conical wall 96 (FIG. 3). The outer race 48 of the bearing 38 has a cylindrical portion 98 engaging the inner wall 94 of the housing and a tapered frusto-conical portion 100 engaging the tapered inner wall 96 of the housing.

The inner race 50 of the bearing 38 has a tapered portion 102 engaging the conical surface 78 of the wedge and a contiguous generally radial portion 104 adapted to engage the stop 86. The bearing 38 supports the upper shaft portion for rotation and prevents axial movement of the steering shaft in a leftward direction in FIG. 3. The bearing 38 is held against axial movement by the tapered inner wall 96 of the housing 34 and by the wedge 72 of the ring 70.

The inner race 50 of the bearing is supported on the conical surface 78 of the wedge so that the bearing can ride up on this conical surface to the limit provided by the stop 86. While the stop may in some instances be omitted since the conical surface 78 will ordinarily perform its function without the need for the stop and in many instances the inner race will not come into contact with the stop, it is desirable to provide a stop as an ultimate limit in the movement of the inner race of the bearing along the conical surface 78 of the wedge.

The spring flange 74 of the spring wedge unit 70 has its radially inner surface in engagement with the conical surface 60 on the enlargement 26. The more axial pressure imposed on the ring by the bearing, the more the spring flange will flex and even ride up on this conical surface. The ring itself is capable of some axial movement along the extension 54 of the enlargement. The flexing of the spring flange provides resilient pressure holding the shaft firmly in the bearing and without the usual chatter or noise that has been associated with bearing support systems used in the past. Any tendency of the ring to shift to the right in FIG. 3 will result in more flexing of the spring flange and further dampening of vibration and suppression of noise.

What is claimed is:

1. A steering column assembly for an automotive vehicle comprising an elongated steering shaft, a housing having a passage through which said shaft extends, bearing means supporting said shaft for rotation in said housing comprising an annular bearing encircling said shaft, said housing having a wall providing a radially outer support for said bearing and for retaining said bearing against axial movement in a first axial direction relative to said shaft, and a spring wedge unit providing a radially inner support for said bearing and retaining said bearing against axial movement in a second axial direction relative to said shaft, said spring wedge unit comprising an integral one-piece ring of flexible resilient material encircling said shaft, said ring having a first end and a second end, said ring having an annular wedge adjacent said first end and an integral annular spring flange adjacent said second end, said wedge having a cylindrical radially inner surface of uniform circular cross-section in bearing contact with said shaft, said wedge having a conical radially outer surface concentric with said radially inner surface providing a radially inner support for said bearing, said radially outer surface tapering toward said radially inner surface and substantially intersecting said radially inner surface at the first end of said ring, said spring flange being frusto-conical in shape and inclined radially outwardly from a point intermediate said first and second ends of said ring wherein it merges into said wedge, said shaft having annular portion opposed to said spring flange adjacent the second end of said ring, said spring flange abutting said annular portion of said shaft under pressure resiliently flexing said spring flange and resisting axial movement of said ring in said second axial direction, wherein said ring further comprises an integral annular stop spaced axially from the first end of said ring and projecting radially outwardly from the conical surface of said wedge.

2. A steering column assembly as defined in claim 1, wherein said radially outer surface of said wedge extends at an angle of about 20° to said radially inner surface, and said spring flange has radially inner and outer surfaces both extending at an angle of about 30° to said radially inner surface of said wedge.

3. A steering column assembly as defined in claim 2, wherein said stop has axially spaced surfaces facing in said first and second directions respectively and both extending perpendicular to said radially inner surface of said wedge.

4. A steering column assembly as defined in claim 3 wherein said spring flange has an end wall at the second end of said ring which is perpendicular to said radially inner surface of said wedge.

5. A steering column assembly as defined in claim 4, wherein said entire ring is made of urethane.

6. A steering column assembly as defined in claim 1, wherein said radially outer surface of said wedge extends at an angle of about 20° to said radially inner surface.

7. A steering column assembly as defined in claim 1, wherein said spring flange extends at an angle of about 30° to said radially inner surface of said wedge.

8. A steering column assembly as defined in claim 1, wherein said ring is made of urethane.

* * * * *